United States Patent
Van Sant et al.

(10) Patent No.: US 11,080,770 B2
(45) Date of Patent: Aug. 3, 2021

(54) SYSTEMS AND PROCESSES FOR OPERATING A DIGITAL MARKETPLACE EXCHANGE THAT TRANSACTS THE OFFER AND SALE OF GOLF PRODUCTS AND SERVICES FOR FUTURE REDEMPTION

(71) Applicant: FairwayPass LLC, Pipersville, PA (US)

(72) Inventors: Andrew Van Sant, Pipersville, PA (US); Jason Lewin, Pipersville, PA (US); Philip Morrash, Pipersville, PA (US)

(73) Assignee: Fairway Pass LLC, Pipersville, PA (US)

(*) Notice: Subject to any disclaimer, the term of this patent is extended or adjusted under 35 U.S.C. 154(b) by 82 days.

(21) Appl. No.: 16/269,158

(22) Filed: Feb. 6, 2019

(65) Prior Publication Data
US 2019/0244265 A1    Aug. 8, 2019

Related U.S. Application Data

(60) Provisional application No. 62/627,427, filed on Feb. 7, 2018.

(51) Int. Cl.
*G06Q 30/00*    (2012.01)
*G06Q 30/06*    (2012.01)
(Continued)

(52) U.S. Cl.
CPC ......... *G06Q 30/0601* (2013.01); *G06Q 20/24* (2013.01); *G06Q 20/3224* (2013.01);
(Continued)

(58) Field of Classification Search
CPC ..... G06Q 30/0601–0645; G06Q 30/80; G06Q 20/24; G06Q 20/3224; G06Q 20/405; G06Q 30/0239; G06Q 50/10
(Continued)

(56) References Cited

U.S. PATENT DOCUMENTS 7,249,041 B2    7/2007    Last
7,487,112 B2 *  2/2009    Barnes, Jr. .............. H04W 4/18
                                                       705/26.8
(Continued)

FOREIGN PATENT DOCUMENTS

JP    2003248771    9/2003
JP    2005084797    3/2005
(Continued)

OTHER PUBLICATIONS

"What's your tee time? Ask Scottsdale-grown app Golfpay," azgolfhomes.com, Nov. 4, 2016, 4pgs. (Year: 2016).*

*Primary Examiner* — Robert M Pond
(74) *Attorney, Agent, or Firm* — Stradley Ronon Stevens & Young, LLP

(57) ABSTRACT

A computer-based digital marketplace exchange is disclosed, providing the functionality of offering rounds of golf for sale, as well as conducting the sale of the rounds of golf. Customers can use the system to build, purchase, and redeem rounds, subject to at least one rule uploaded by the course. Once an order is purchased with the system, a customer's account is credited. When the customer seeks to redeem the round, the system can be configured to access a real-time positioning component and temporal component of a customer's mobile computer device. The system determines whether the time/location of the customer violates the rules placed on the round. If the rules are violated, then the system notifies the customer that he/she is prohibited from
(Continued)

redeeming the round. Conversely, if the rules are not violated, then the round is redeemed and the course notified of the customer's arrival.

14 Claims, 8 Drawing Sheets

(51) Int. Cl.

| | | |
|---|---|---|
| *G06Q 20/32* | (2012.01) | |
| *G06Q 20/24* | (2012.01) | |
| *G06Q 20/40* | (2012.01) | |
| *G06Q 30/02* | (2012.01) | |
| *G06Q 50/10* | (2012.01) | |

(52) U.S. Cl.
CPC ........ *G06Q 20/405* (2013.01); *G06Q 30/0239* (2013.01); *G06Q 50/10* (2013.01)

(58) Field of Classification Search
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2, 26, 27
See application file for complete search history.

(56) References Cited

U.S. PATENT DOCUMENTS

| | | | |
|---|---|---|---|
| 7,634,426 B2 | 12/2009 | Craw et al. | |
| 2002/0095391 A1* | 7/2002 | Swart | G06Q 10/04 705/400 |
| 2004/0249681 A1 | 12/2004 | Staten et al. | |
| 2006/0089845 A1 | 4/2006 | Marcell et al. | |
| 2008/0120157 A1 | 5/2008 | Foster | |
| 2009/0043616 A1 | 2/2009 | Vargas Chavez | |
| 2009/0094072 A1 | 4/2009 | Rodenberg | |
| 2009/0210263 A1* | 8/2009 | Smeenge | G06Q 10/02 705/5 |
| 2009/0254382 A1* | 10/2009 | Weeks | G06Q 10/02 705/5 |
| 2010/0082569 A1* | 4/2010 | Cresto | G06Q 10/087 707/705 |
| 2010/0211427 A1 | 8/2010 | Morelli et al. | |
| 2013/0204648 A1 | 8/2013 | Natsume et al. | |
| 2013/0304528 A1 | 11/2013 | Natsume et al. | |
| 2014/0108068 A1 | 4/2014 | Williams | |
| 2017/0216703 A1* | 8/2017 | Stephens | H04W 4/025 |
| 2018/0032997 A1* | 2/2018 | Gordon | G06Q 30/0269 |

FOREIGN PATENT DOCUMENTS

| | | |
|---|---|---|
| JP | 5900404 | 4/2016 |
| KR | 101402467 | 6/2014 |

* cited by examiner

| Rounds | Weekend? | Time of Day | Cart | Price |
|---|---|---|---|---|
| 1 | True | Morning | True | 50 |
| 2 | True | Morning | True | 40 |
| 3 | True | Morning | True | 30 |
| 1 | False | Evening | True | 45 |

600

SYSTEMS AND PROCESSES FOR OPERATING A DIGITAL MARKETPLACE EXCHANGE THAT TRANSACTS THE OFFER AND SALE OF GOLF PRODUCTS AND SERVICES FOR FUTURE REDEMPTION

CROSS REFERENCE TO RELATED APPLICATION

This application claims the priority and benefit of U.S. Provisional Patent Application Ser. No. 62/627,427, titled "Systems and Processes for Operating a Digital Marketplace Exchange that Transacts the Offer and Sale of Golf Products and Services for Future Redemption," filed on Feb. 7, 2018, the entirety of which is incorporated herein by reference.

FIELD OF THE INVENTION

The invention relates generally to a digital marketplace exchange for marketing and selling golf products and services. The invention specifically provides systems and processes for golf courses to market and sell, as well as individuals to purchase, golf products and services, e.g., one or more rounds of golf at one or more golf courses, whereby the golf products and services are redeemable at a golf course(s) conditioned upon applicable rules that are present in the exchange.

BACKGROUND

Every year millions of golfers hit the links. A round of golf can cost anywhere from ten dollars at some public courses to thousands of dollars at private courses. However, all but the most exclusive courses have the same issue—predictable cash flow.

Numerous factors—alone, and in combination—impact the ebb and flow of golfers playing golf, such as, course conditions, course availability, weather, seasons, holidays, etc. Indeed, golf courses sell umbrellas for a reason—golfers need them if it rains. Storms can cause golfers to stay away entirely. Excessive temperatures may also drive golfers off the course. Seasons and holidays include personal commitments that compete with golfer availability to play. The number of playable days may swing wildly year to year and provide unpredictability for course use and generated revenue.

Further complicating golf course usage is that not all playable days are equal. Some golfers only play a morning weekend round, rather than a morning weekday round, or vice versa. As is a typical transaction, golfers have to schedule a tee time and then actually show up to a golf course to purchase the round of golf. The numerous factors impacting the ebb and flow of golfers affects the unpredictability of the number of playable days, as well as the desirability of the playable days, all directly influencing a golf course's finances.

Indeed, on playable weekends, a golf course may sell a lot of rounds, on playable weekdays a golf course may sell some rounds, and on unplayable days, a golf course may sell no rounds at all. Such a dynamic coupled with the factors of unpredictability causes cash flow peaks and valleys.

As a result of this unpredictability, there is a present need for a digital marketplace exchange for golf courses to (i) offer goods and services, e.g., one or more rounds of golf, at prices determined by the golf courses and managed with a specially-programmed data system that presents multiple offers through the exchange (ii) for sale to the public, or to preferred members of the exchange, on a web or mobile platform so that (iii) the public, or preferred members, can purchase one or more rounds of golf at one or more golf courses through the web or mobile platform, which (iv) exchanges data with the data system and also conducts sales by interacting with a point of sale (POS) platform and provides the purchaser with a voucher for future redemption at the golf course(s) from which the one or more rounds of golf were purchased.

The digital marketplace exchange allows for golf courses to sell rounds of golf at any time and, also, to collect revenue from those sales at the moment of purchase, to predict the amount of golf that will likely be played on its course(s) based on the sales through the exchange, and then to deliver its golf goods and services at a later time when a golfer reserves and then shows up for his/her tee time to play a pre-paid round of golf.

In addition to the benefits that the invention provides to golf courses, the invention also benefits golfers, and may even entice others to start playing golf, by addressing at least the following problems facing golfers in the industry.

Current golf memberships are not suitable for the majority of people that play golf. These memberships have drawbacks including the cost of membership (e.g., thousands of dollars), members need to play a lot of rounds of golf in order to simply break even on the membership cost, there is limited personalization for a golfer, there are not enough options based on frequency or timing of play, and members can only play one course which leads to monotony from playing the same course.

Golf courses are currently not positioned to best suit the needs of the Millennial generation, who are unattached (e.g., low levels of brand loyalty, likely to jump from one brand to another), connected (e.g., prefer to interact with companies digitally), and unconstrained (e.g., don't accept the old adage of "that's the way it's always been done" and prefer to be approached by companies in a customized manner).

The pricing model for golf is inefficient in that it offers golfers generally only two options, namely, (1) pay for an unlimited membership at one course, regardless of your personal playing frequency/preferences, or (2) pay for golf each time you want to play and always pay the same price regardless of how many times you play within a season.

Accordingly, there is also a present need for golf courses to adjust their pricing model to accommodate golfers who are willing to pay for a season's worth of rounds upfront and allow them to do so in a customized manner at a discounted price. The invention also addresses the foregoing need, as well as other problems facing golfers.

These and other features, aspects, and advantages of the invention are provided and are better understood with reference to the following description and appended claims.

SUMMARY

The systems and processes of the invention provide a digital marketplace exchange through which golf courses can offer rounds of golf for sale that customers can purchase and then redeem at a later time at one or more golf courses, subject to certain rules uploaded by the golf course to the digital marketplace exchange. Thereafter, when the customer seeks to redeem the round of golf at a course at a post-purchase time, the systems and processes can use real-time position elements and temporal elements located on the customer's mobile computer device to confirm that the redemption complies with the rules attached to the purchased round.

The invention operates through a system architecture comprising (i) a user interface, e.g., UI/UX, (ii) an API, which interacts with the user interface, a data system, and third party data systems, all of which operate with the system architecture, and includes a pricing engine, package engine, billing engine, and tee time scheduler, and (iii) data system having processors and at least one database used to store and present data including data about golf courses, course reviews, accounts receivable/payable, pricing rules, and transactions through the user interface.

In a non-limiting, exemplary embodiment, the system uses a processor to call up a list of relevant golf courses which have been previously uploaded into the system by an owner, employee, or agent of one or more golf courses. The system then lists on a website or mobile application the various offers of one or more rounds of golf from one or more golf courses, subject to rules previously uploaded by an owner, employee, or agent of the courses. The system is configured to receive a customer order, transact the purchase, and then credit the customer's account with a redeemable voucher for the number of rounds of golf for the participating golf course(s). Thereafter, when the customer redeems the purchased round, the system can optionally operate a real-time position component, located on the customer's mobile computer device, and/or a temporal component to determine if the redemption of the round is consistent with rules related to the purchase, e.g., day, time, etc., imposed on the round. If the rules are violated, then the system notifies the customer that the round cannot be currently redeemed. Conversely, if the rules are not violated, then the system can optionally notify the golf course of the customer's arrival to play the round of golf.

In certain embodiments, the system may transmit multiple offers to play different golf courses located at different golf clubs to the customer. Such offers may be comprised of (1) two or more costs for two or more rounds, (2) two or more rules each related to a separate round, (3) any discount offered for each rule, and (4) executable instructions, to create two or more options to purchase and transmit the two or more options to purchase to the software application. In other embodiments, such offers may be ranked by proximity to the mobile computer device.

Certain embodiments of the system may permit the customer to set alarms or reminder times. These alarms or reminders may notify the customer of the scheduled round or the impeding expiration of a credit in relation to the location or time of the customer based on their mobile computer device. For example if the customer lives in Pennsylvania but travels to Hawaii on vacation, prior to leaving Hawaii, the system may remind the customer that round credits restricted to Hawaii should be redeemed before the customer returns to Pennsylvania. Similarly, a group may set an alarm that alerts all members of the scheduled tee time for the group.

A method for electronically scheduling a round of golf is also disclosed. Such methods may include receiving an order for a round of golf that has been placed using a software application operating on a mobile computer device that is synced with the mobile computer device having a real-time positioning system, a temporal component or a computer device, and linked to a customer account, wherein the order is subject to at least one rule contain a spatial or temporal limitation attached to the round's play, which has been previously uploaded to the database by an owner, employee or agent of the golf course and whereby the mobile computer device and the computer device communicate with a remote server of the system at a golf course or a location remote to the golf course location through wired and/or wireless communication networks. Upon receiving the order in the system, crediting the customer account, subject to the rule. Receiving a request to redeem the order using the software application operating on the mobile computer device. Upon receiving the redemption request, comparing (1) a spatial location of the mobile computer device using the real-time positioning system connected to the mobile computer device, and (2) a temporal location of the unique mobile computer device using the temporal component connected to the mobile computer device, and whereby the credit may only be redeemed if both the spatial and temporal location of the unique mobile computer device do not violate the rule attached to the credit. Finally, notifying the golf course of the redemption of the order.

BRIEF DESCRIPTION OF THE FIGURES

Additional aspects, features, and advantages of the invention, as to its structure, components, configuration, functionality, and operability will be understood and become more readily apparent when the invention is considered in light of the following description of the figures made in conjunction with the accompanying figures, wherein.

DETAILED DESCRIPTION OF THE INVENTION

Figure 1:
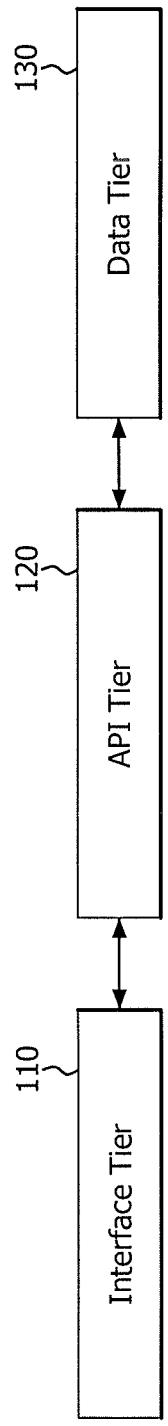
FIG. 1 shows a flow chart of the high level architecture of the system.

Various embodiments of the invention are described in detail below. Although specific implementations are described, it should be understood that this is provided for illustration purposes only.

The invention addresses the need for systems and processes that provide a digital marketplace exchange useful for offering for sale and selling one or more rounds of golf at one or more golf courses, subject to at least one rule related to the purchase of at least one round of golf previously uploaded into the system by an owner, employee, or agent of a golf course. Such a system allows for golf courses to offer rounds of golf for sale on a year round basis and to realize revenue from the sales occurring at any time using the invention. This provides golf courses with improved sales actualization and predictability of course usage.

Golf courses interact with the system by developing and saving into the database of the system a pricing matrix of rounds of golf which includes costs for days and times for rounds of golf, certain packages of rounds of golf, and access for tee time scheduling. Golf courses can update the pricing matrix at any time to facilitate the marketing and sale of golf rounds.

Customers interact (e.g., view, order, pay, etc.) through a wired or wireless web-connected computer device, such as a smartphone, a tablet, or computer. Using the system, a customer can create a certain user profile, and then identify, purchase, and pay for rounds of golf. Once purchased, the system provides the customer with a voucher that memorializes the sale of the purchased round(s) for later redemption by the customer with the golf course. When the customer seeks to redeem the round, the system can use temporal and geo-location components to determine if the redemption violates the rules imposed on the original purchase. If the redemption is permitted (i.e., it does not violate the rules imposed on the original purchase), then the system may notify the golf course of the customer's arrival.

A detailed discussion of the system surrounding the digital marketplace exchange for managing the offer, purchase of vouchers, payment, and redemption of vouchers is provided below. First, a system overview is discussed. Next, an outline of the system components is provided. A description of a cloud computing system, an exemplary environment of the system, is then disclosed. The collection and retention of relevant data is outlined. The incorporation of additional parameters to the system is then disclosed. Finally, an example of the manner by which a package offer is made to one customer and not another is provided.

System Overview

The system:
(A) uses at least one processor to call up a list of relevant golf courses that saved pricing matrices in the database of the system and presents data about rounds of golf offered for sale through the digital marketplace exchange;
(B) receives a customer order placed using:
  (1) a software application operating on (a) a mobile computer device (e.g., cellphone smartphone, tablet, laptop computer, or wearable computer device such as a smartwatch, etc.) that has a temporal component and a real time positioning system component (e.g., GPS, Wi-Fi Bluetooth, etc.), or (b) a computer device (e.g., laptop or desktop computer) that is synced with a mobile computer device that has a temporal component and a real time positioning system component that can be enabled, or
  (2) a website accessed by a mobile computer device or a computer device having a registered customer credentials that are synced to a software application operating on a unique mobile computer device (cellphone, smartphone, tablet, laptop computer, etc.) that has a temporal component and a real time positioning system component that can be enabled, whereby the mobile computer device and the computer device are configured to communicate with a server (e.g., at a golf course or a location remote to the golf course) of the system using wired and/or wireless communication networks (e.g., cellular, Wi-Fi, LAN, WAN, satellite-based, etc.);
(C) uses a processor to call up from the database of the data system upon request from the software application: (1) a customer account, (2) a cost for the round, which has been previously uploaded by an owner, employee or agent of the golf course, (3) at least one rule attached to the round's play, which has been previously uploaded by an owner, employee or agent of the golf course, (4) any discount offered for the rule, which has been previously uploaded by an owner, employee or agent of the golf course, and (5) executable instructions;
(D) uses the processor to combine: (1) the cost for the round, (2) the rule, (3) any discount offered for the rule, and (4) the executable instructions, to create the option to purchase and transmit the option to purchase the software application; and
(E) executes the instructions upon acceptance of the option to purchase causing the system to submit to a POS system the payment method for settlement for the cost of the round less any discount for the rule and credit the customer account, subject to the rule.

Optionally, the system can be configured to:
(F) use the processor to determine, upon a request to redeem the purchased round: (1) a location of the mobile computer device using the real-time positioning system, (2) a current time using the temporal component; and (3) whether either the location or time of the mobile computer device violates the rule; and
(G) notify the golf course, by communicating with a wired or wireless communication network to a computer device at the golf course, the customer has arrived when the real-time location and time of the customer does not violate any rule attached to the round's play.

Systems Architecture

As disclosed in FIG. 1, the system can be segregated into a three-tiered architecture, namely, an interface tier 110, an API tier 120, and a data tier 130.

The customer interacts with the system using the interface tier 110, e.g., a user interface UI/UX. This interaction uses a computer device operating an iOS, Android, or other application that communicates with the API tier 120 using TCP/IP over the Internet.

The interface tier 110 communicates with the application programming interface (API) tier 120 to retrieve data and perform work. The interaction can occur via a TCP/IP over the Internet. The API tier 120 interacts with all other tiers—interface tier 110 and data tier 130. More specifically, the API tier 120 interacts with a data tier 130 which stores and calls up pertinent information to facilitate operability of the digital marketplace exchange. The API may also be responsible for interacting with third party systems, such as payment vendors, e.g., POS. Furthermore, the API tier 120 may include a pricing engine, a package engine, a billing engine, a tee time scheduler, or any combination thereof.

The system includes a server comprising a processor aided by memory that communicates with a database in the data tier 130. The database(s) may contain golf course locations, course reviews, account information (e.g., customer accounts or receivable/payable accounts), pricing rules, i.e., pricing matrix (e.g., predetermined round costs, rules, or discounts for the rules), or transactions. The database(s) may be physically located at the golf course or at a remote location.

The rules may be spatial or temporal. Examples of spatial rules may include golf clubs having two or more separate courses available for play. The spatial limitation may be restrict to a specific course. Furthermore, the spatial limitation may require the customer to tee off from a specific tee box and proceed around the golf course in a specific manner. For example, the spatial limitation may require the customer to tee off from hole three and progress through the holes in that manner (e.g., holes 1 and 2 will be played as though they are holes 17 and 18). The temporal limitation may restrict the time period in which the credit may be redeemed. For example, the credit may only be able to be redeemed on Tuesdays or Thursdays between 3 pm and 6 pm.

When the customer accesses the system, relevant golf course locations stored in a database are accessed by the server and transmitted to the customer's computer device or mobile computer device for display. In an embodiment, the customer has created a user profile related to preference for rounds of golf, e.g., locations, days, times, travel schedule, conditions, etc. The golf course locations can be directly uploaded to the database by the owners, employees or agents of the golf course, third parties or pulled from relevant public database and/or websites (e.g., Google Maps®, which is a registered trademark of Google Inc.). The customer then selects which golf course location (s)he wishes to purchase rounds from. In an embodiment, the customer may select a golf package developed by one or more golf courses, or the operator of the digital marketplace exchange. Golf packages can be selected for any variety of options including location, cost, holiday/weekend specials, etc.

The server is configured to receive a purchase order and collect payment from a customer's computer device through a third party POS system. It is configured to provide the customer with a voucher that memorializes the payment for the rounds of golf. The server also communicates the purchase to a golf course computer. The server can also be configured to determine the real-time position of the customer using a temporal component and real time positioning system component of the customer's computer device, when the customer seeks to redeem the purchased round.

Examples of real time positioning system components are GPS, Wi-Fi enabled real time tracking, Bluetooth, and Near Field Communication. Such systems can provide the location data necessary to determine the real-time position of the customer. The real-time positioning monitor may be set to monitor the customer's location: (1) only at redemption, (2) at a set interval, or (3) continuously monitor the customer's location.

When an order is completed, the order is reflected in the customer's account, with at least one rule attached to the purchase (e.g., the round can only be redeemed at the course that sold the round). When the customer seeks to redeem the round at a golf course, the server determines the customer's location, and determines whether the customer's location violates the rule placed on the round's play. If the time or the customer location violates the rule, then the customer is prevented from redeeming the round. Conversely, if the time and the customer's location do not violate the rule, the course is notified that the customer has arrived to play the round.

Round Purchase

Figure 3:
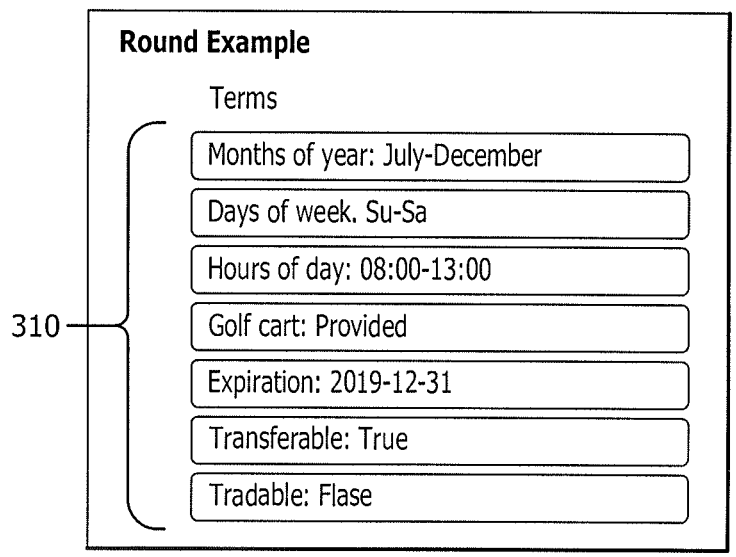
FIG. 3 shows an embodiment of an offer to sell a round of golf with rules placed on the purchase of the offered round.

The information contained on the database related to course location, round cost, rules to be placed on round purchase, and discounts to be attached to each rule can be uploaded by owners, employees or agents of the golf course or a third party. FIG. 3 depicts one embodiment of an offer to a customer with 7 rules 310 placed on the purchase of the round. There can be a plurality of rules 310 placed on any round of golf offered for sale through the digital marketplace exchange.

Certain rules 310 can also be automatically implemented and not displayed to the customer. For example, the specific month(s), day(s) of the week, or time(s) that the credit may be redeemed may be restricted. Furthermore, the credit may have an expiration date or the availability of golf cart(s) may be restricted. Finally, the credit may or may not be transferable or tradable to other user(s).

Figure 4A:
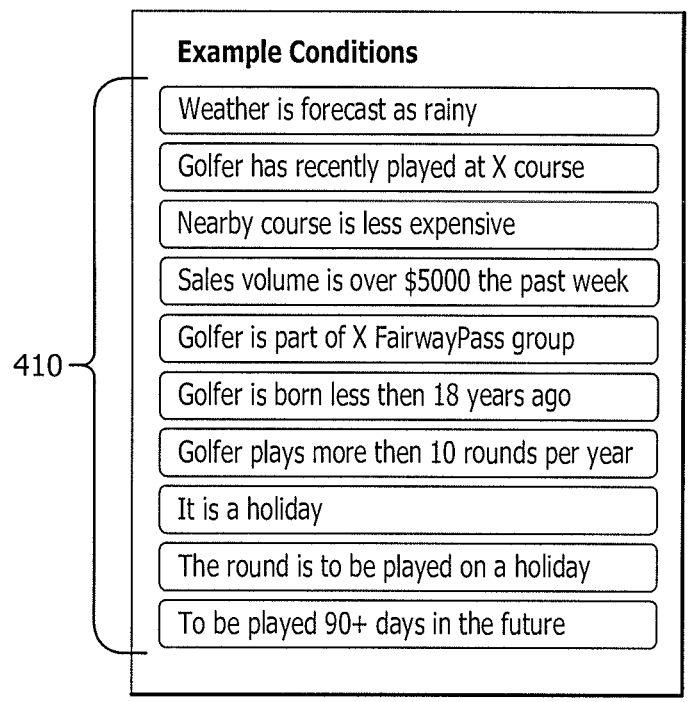
FIG. 4A shows an embodiment of conditions that impacts the price of a round of golf.
Figure 4B:
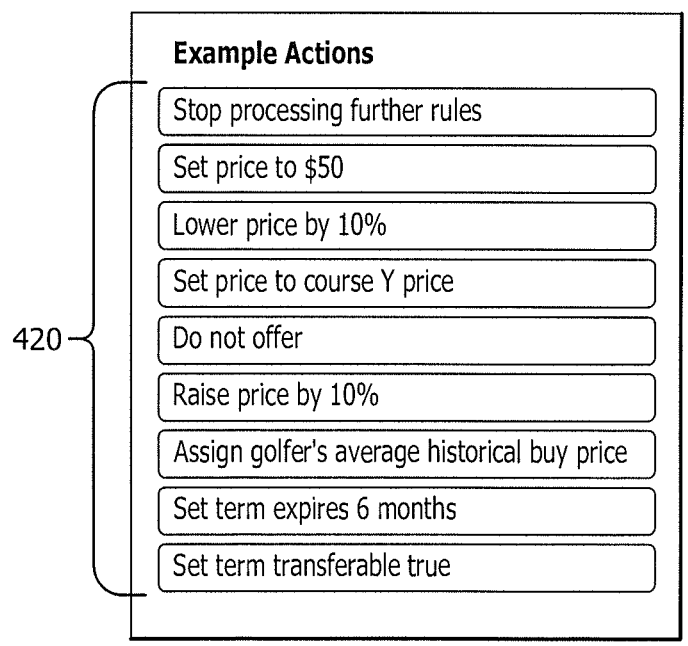
FIG. 4B shows an embodiment of actions that impacts the pricing related to conditions identified in FIG. 4A.

Pricing conditions and actions are both extensible in that new types of rules and actions can be added without changing the way the rules are evaluated and processed. FIGS. 4A and 4B depict one embodiment of conditions 410 and related actions 420, which may be implemented, but not shown to the customer in a form other than an increase or decrease of prices. Examples of conditions that may affect price are rain is forecast, the user has recently played the offered course, a nearby course is less expensive, the offered course has had sales volumes over a certain threshold previously sent by the owner or their agents, the user is a minor, the user plays more than a certain number of rounds specified by the owner or agent, it is a holiday or the round is to be played on a holiday, or the round is to be played more than 90 days in the future. Actions 420 that may be taken in response to such conditions 410 are: rules may be removed from subsequent offers, the offer may not be extended to the user, the term of the offer may be shorted or extended, the transferability of the credit to other users may be offered or restricted, or the price for a round may be set raised or lowered by a specific amount or percentage which has been previously uploaded by the owner or agent of the course.

Pricing Engine

Figure 5:
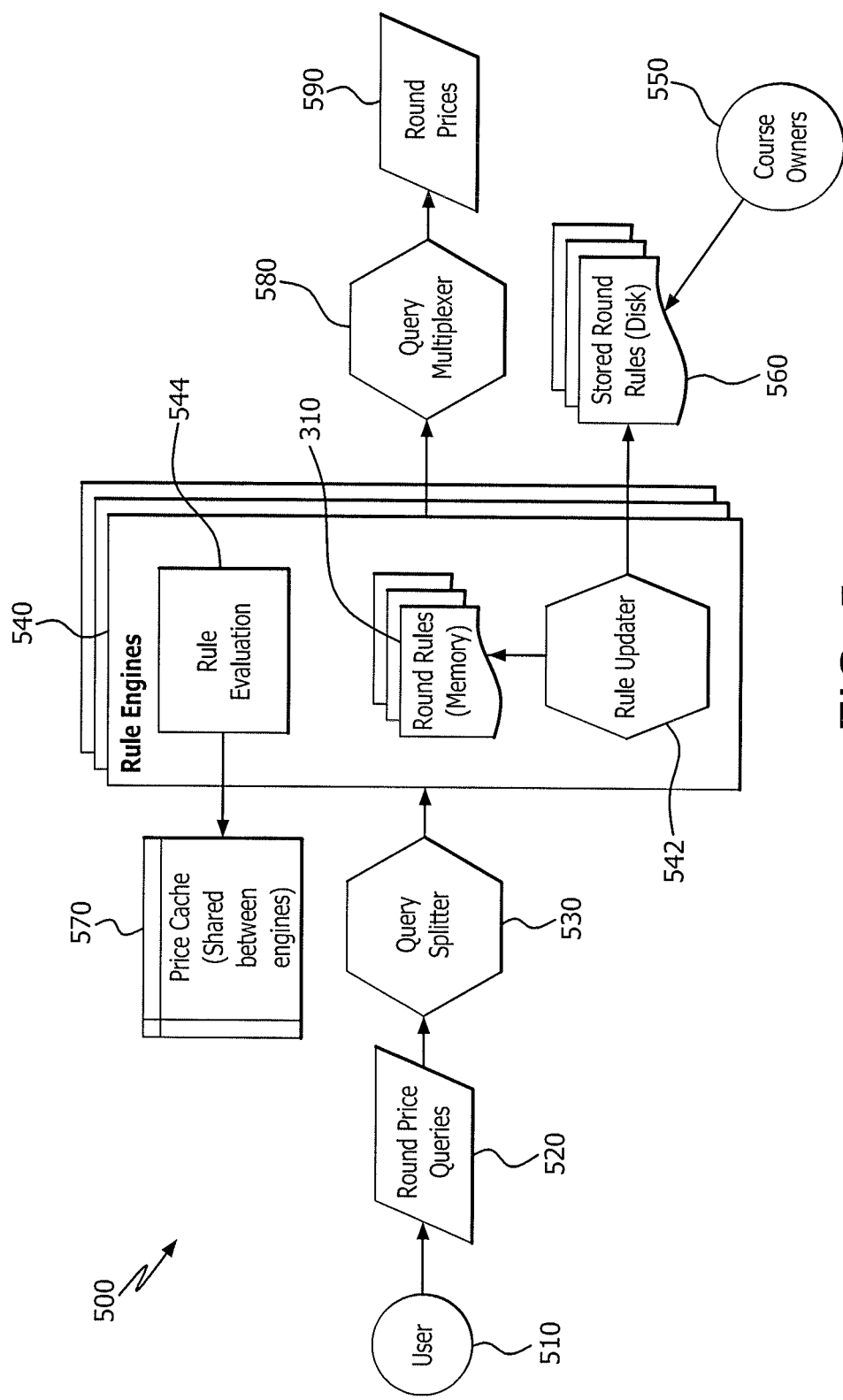
FIG. 5 shows a flow chart for an embodiment of a pricing engine of the system.

Because customers of the system can make decisions based on the cost of a round of golf, the API tier 120 contains a pricing engine 500. The pricing engine may allow golf courses to provide specific pricing on a per round basis as established by a set of rules. A non-limiting, exemplary embodiment of the pricing engine is depicted in FIG. 5. In such an embodiment a user 510 submits a price query 520. The queries 520 are submitted to a rules engine 540.

The pricing engine contains at least one rule engine 540. The rule engine 540 allows owners or agents of individual golf courses 550 to specify one or more rules 560 to price their rounds. Rules 560 may be defined through a customer interface, but saved to the server of the data system. The specific language for the rules may be domain specific. Each rule may be composed of one or more conditions. An evaluator 544 may permit rules to be evaluated in a predefined sequence that can be determined by the course owner, employee, or agent. Rules may also be time sensitive, and they may be limited in how long they may be cached in the system. As a result, the rule engine can be configured to interface with a shared cache 570 when computationally prudent.

The pricing engine can also be configured to contain a query splitter 530. Although each query for a price can be processed at the same time, a query splitter 530 may be incorporated to farm such work out across a cluster.

The pricing engine can also be configured to contain a query multiplexer 580. The query multiplexer combines all the rule results into a single response to be sent back to the requester as a round price subject to certain rules 590.

The pricing engine can also be configured to contain a rule updater 542. The rule updater 542 permits an owner, employee, or agent of a course to update rules at regular intervals, in real time, or automatically.

Figures 6, 7:
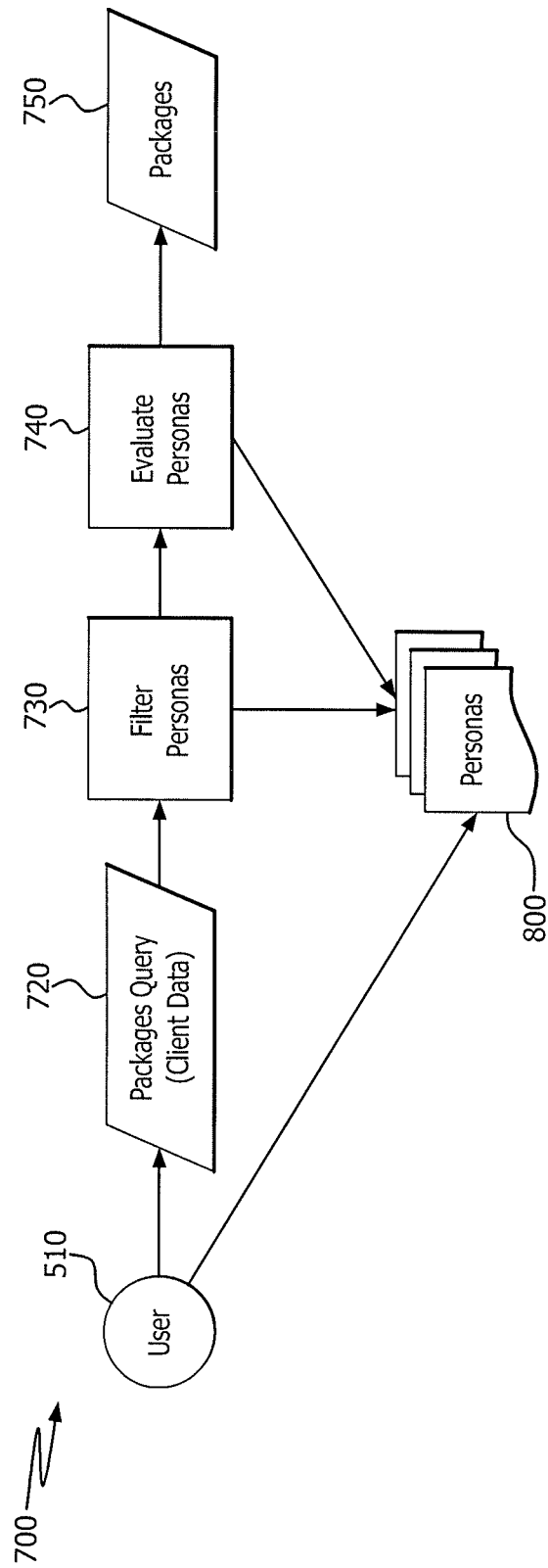
FIG. 6 shows an embodiment of a pricing matrix of the system.
FIG. 7 shows a flow chart for an embodiment of a package engine of the system.

One way golf courses can specify their pricing rules is by creating and storing a pricing matrix. Such a matrix can combine price, round quantity, round time of day, day of the week, and whether or not a cart is allowed into a single UI/UX element the course owner, employee, or agent may interact with. A non-limiting, exemplary embodiment of a pricing matrix 600 is depicted in FIG. 6.

Package Engine

As both courses and customers derive more value using the digital marketplace exchange with greater volume of purchases made, the system can also offer packages of rounds at one golf course or at multiple golf courses. This creation of packages will reside on the API tier 120 and can be automated on a per customer or course basis. A non-limiting, exemplary embodiment of the package engine 700 is shown in FIG. 7.

Figure 8:
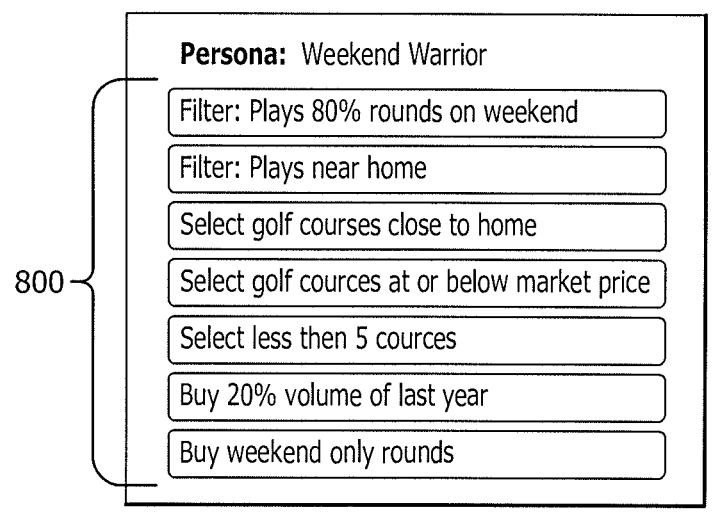
FIG. 8 shows an embodiment of a package persona for rounds of golf that can be offered using the system.

Before a package may be created by the system or a golf course and offered through the digital marketplace exchange, a package persona 800 can be created. A non-limiting, exemplary embodiment of a package persona is shown in FIG. 8.

The customers that use the system may then be filtered based on stored information in a personal profile 730. The personas 800 may be compared 740 to determine if they with rules 310 to determine if they align with the rules 310 of the package. For example, a user that only golfs on weekends may not be offered a package that is restricted to redemption during the week. Furthermore, a user that only golfs on vacation may not be offered a package to a local course. Personas that match the rules of the package may then be offered the package 750. Packages can have inherent discounting built in. Preferably, however, the packages will be a thoughtful combination of rounds with rules constructed by the owner, employee, or agent of the courses.

Billing Engine

Figure 9:
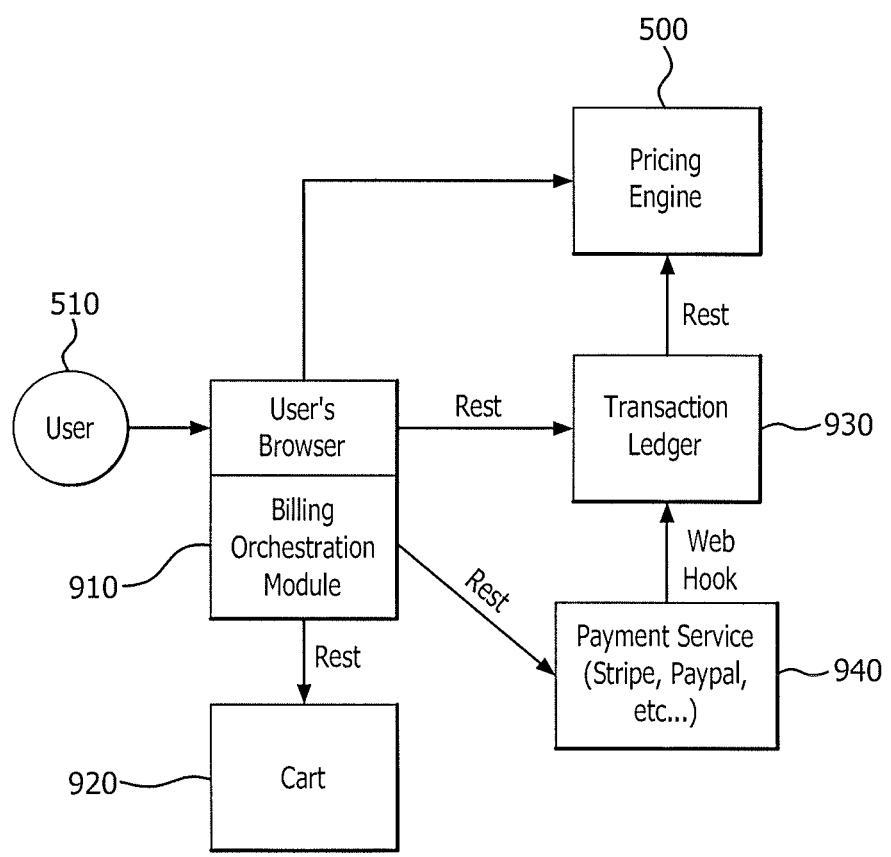
FIG. 9 shows a flow chart for an embodiment of a billing engine of the system.

After a customer 510 has selected a combination of rounds or packages to purchase, the next step is to complete the checkout process and make payment through the billing engine. A non-limiting, exemplary embodiment of the billing engine is shown in FIG. 9.

In a non-limiting example, after the customer 510 submits the purchase using a browser 910, the following process is executed. First, the processor calls up the customer's latest shopping cart 920. Next, the processor calls up the pricing engine 500 to calculate the cost of the purchase. The processor then calls up the course list from a transactional ledger 930 located on the database and records an account receivable entry in the customer's account based on the purchase and rules attached thereto. The processor calls up the payment method 940 from the customer's account and submits the payment method for settlement. The processor confirms receipt of the funds and notes the same on the transactional ledger 930, thereby permitting the redemption of the round.

Tee Time Scheduler

Figure 10:
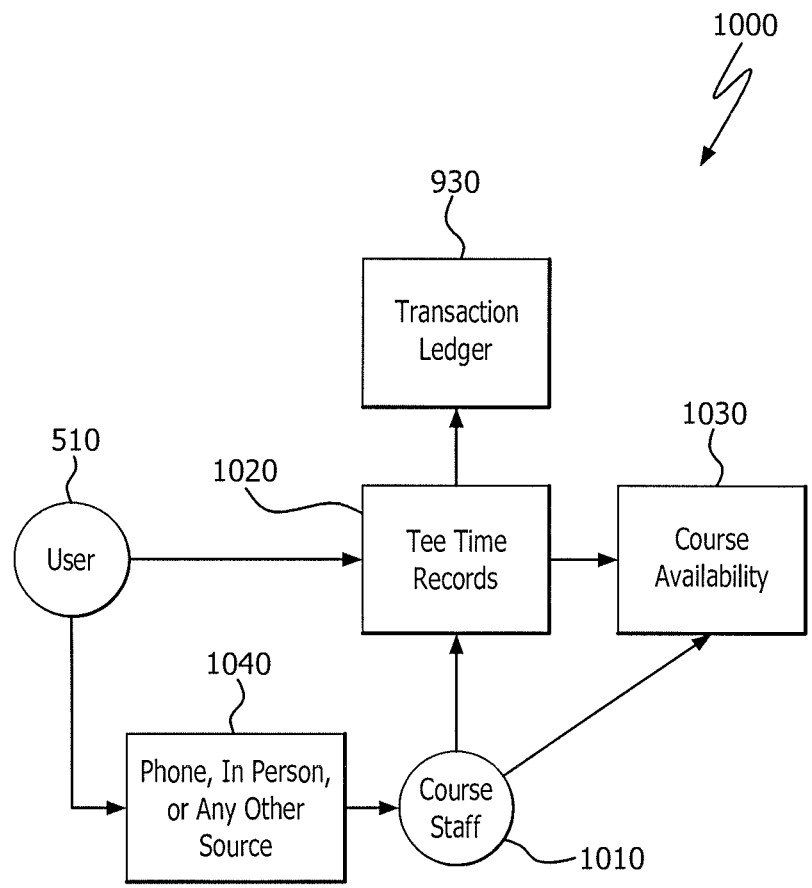
FIG. 10 shows a flow chart for an embodiment of a tee-time scheduler of the system.

The system may include a tee time scheduler 1000 to assist a customer 510 in redeeming their purchased round. A non-limiting, exemplary embodiment of the tee time scheduler is shown in FIG. 10.

The tee time scheduler will require an owner, employee, or agent of a golf course 1010 to upload their available tee-times 1020. The system may be linked with third party software so as to permit real-time updating of available tee times at each course.

In certain embodiments, the user customer 510 may personally contact the course staff 1010 to request the tee time records 1020. Such contacts 1040 may be via phone, text, email or in person.

The processor will then call up available tee times 1030. Customers may then select which tee time they wish to redeem. If the tee time chosen does not violate any rules of the round the customer is seeking to redeem, then the customer is given the tee time and the processor debits the round from the customer's account. Conversely, if the selected tee time does violate the rules of the round the customer is seeking to redeem, then the customer is offered the option to purchase the tee time using the stored payment method.

System Components

Figure 2:
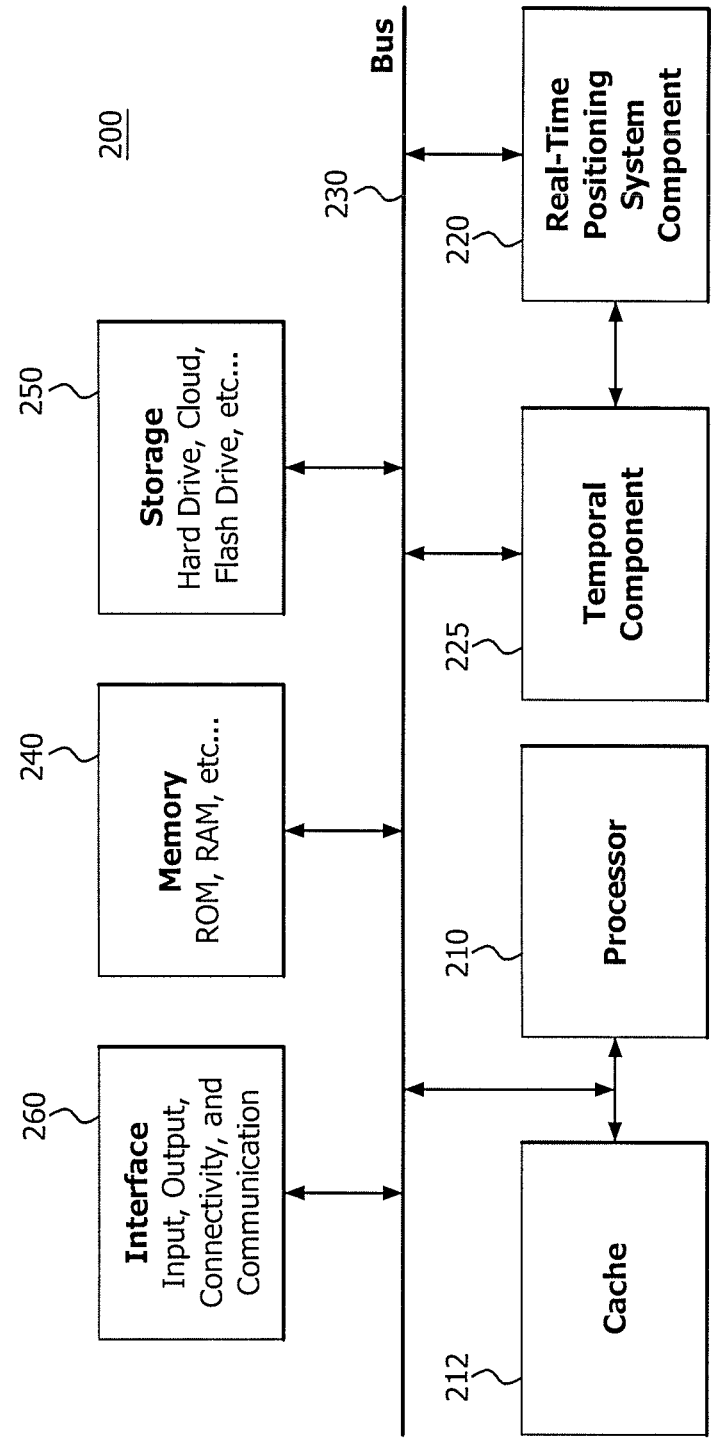
FIG. 2 shows hardware components of the general system.

Referring now to FIG. 2, a system 200 includes a general purpose computing device, including a processing unit (CPU or processor) 210, an optional real-time positioning device 220, an optional temporal component 225, and a system bus 230 that couples various system components including the system memory 240 such as read only memory (ROM) and random access memory (RAM) to the processor 210. The system can include a storage device 250 connected to the processor 210 by the system bus 230. The system can include interfaces 260 connected to the processor by the system bus. The system can include a cache 212 of high speed memory connected directly with, in close proximity to, or integrated as part of the processor 210. The system can copy data from the memory 240 and/or a storage device 250 to the cache 212 for quick access by the processor. In this way, the cache 212 provides a performance boost that avoids processor delays while waiting for data. These and other modules stored in the memory 240, storage device 250 or cache 212 can control or be configured to control the processor 210 to perform various actions. Other system memory may be available for use as well. The memory 240 can include multiple different types of memory with different performance characteristics.

Computer Processor

The invention can operate in a computing environment with more than one processor or on a group or cluster of computing devices networked together to provide greater processing capability. The processor can include any general purpose processor and a hardware module or software module, stored in an external or internal storage device, configured to control the processor as well as a special purpose processor where software instructions are incorporated into the actual processor design. The processor can be a self-contained computing system, containing multiple cores or processors, a bus, memory controller, cache, etc.

For clarity of explanation, an illustrative system embodiment is presented as including individual functional blocks including functional blocks labeled as a "processor". The functions such blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors may be provided by a single shared processor or multiple processors and use of the term "processor" should not be construed to refer exclusively to hardware capable of executing software. Illustrative embodiments may include microprocessor and/or digital signal processor (DSP) hardware, read-only memory (ROM) for storing software performing the operations discussed below, and random access memory (RAM) for storing results.

Real-Time Positioning System Component

The real-time positioning system component can be a global positioning system (GPS) component used to identify the current geographic location of the individual and/or computer system as well as its location in relation to another location (e.g., the course location). GPS information can be displayed on the system. For example, a map may be displayed on the mobile device and as outlined below directions to the course location may be provided to the customer. The GPS information may be supplemented by other information, such as nearby wireless networks, to determine the current location of the mobile device. For example, in certain embodiments, the mobile device may identify its current location by sensing and/or identifying nearby Wi-Fi networks. The mobile device may be able to identify the geographic location of such Wi-Fi networks and thus, identify its own location based on which Wi-Fi networks it detects and its proximity to the Wi-Fi networks (i.e., Wi-Fi enabled real time tracking). The real-time positioning component may also be a temporal component.

Temporal Component

The temporal component can be a time system used to identify the current time in the geographic location of the individual and/or computer system. Temporal information can be displayed on the system. For example, a clock may be displayed on the mobile device. The temporal information may be supplemented by other information, such as being synchronized with the atomic clock, to determine the exact time.

System Bus

The system bus may be any of several types of bus structures including a memory bus or memory controller, a peripheral bus, and a local bus using any of a variety of bus architectures. A basic input/output (BIOS) stored in ROM or the like, may provide the basic routine that helps to transfer information between elements within the computing device, such as during start-up.

Storage Device

The computing environment can further include a storage device such as a hard disk drive, a magnetic disk drive, an optical disk drive, a solid state drive, a tape drive or the like. Similar to the system memory, a storage device may be used to store data files, such as location information, round prices, rules on round play, discounts related to the rules, software, wired and wireless connection information (e.g., information that may enable the mobile device to establish a wired or wireless connection, such as a USB, Bluetooth or wireless network connection), and any other suitable data. Specifically, the storage device and/or the system memory may store code and/or data for carrying out the disclosed techniques among other data.

In one aspect, a hardware module that performs a particular function includes the software component stored in a non-transitory computer-readable medium in connection with the necessary hardware components, such as the processor, bus, display, and so forth, to carry out the function. The basic components are known to those of skill in the art and appropriate variations are contemplated depending on the type of device, such as whether the device is a small, handheld computing device, a desktop computer, or a computer server.

Although the preferred embodiment described herein employs cloud computing and cloud storage, it should be appreciated by those skilled in the art that other types of computer readable media which can store data that are accessible by a computer, such as magnetic cassettes, flash memory cards, digital versatile disks, cartridges, random access memories (RAMS), read only memory (ROM), a cable or wireless signal containing a bit stream and the like, may also be used in the operating environment. Furthermore, non-transitory computer-readable storage media as used herein include all computer-readable media, with the sole exception being a transitory propagating signal per se.

Interface

To enable customer interaction with the computing device, an input device represents any number of input mechanisms, such as a microphone for speech, a touch-sensitive screen for gesture or graphical input, keyboard, mouse, motion input, speech and so forth. An output device can also be one or more of a number of output mechanisms known to those of skill in the art such as a display screen, speaker, alarm, and so forth. In some instances, multimodal systems enable a customer to provide multiple types of input to communicate with the computing device. The communications interface generally governs and manages the customer input and system output. Furthermore, one interface, such as a touch screen, may act as an input, output and/or communication interface.

There is no restriction on operating on any particular hardware arrangement and therefore the basic features here may easily be substituted for improved hardware or firmware arrangements as they are developed.

Software Operations

The logical operations of the various embodiments disclosed are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module. For example, if a storage device contains modules configured to control the processor, then these modules may be loaded into RAM or memory at runtime or may be stored as would be known in the art in other computer-readable memory locations. Having disclosed some components of a computing system, the disclosure now turns to a description of cloud computing, which is the preferred environment of the invention.

Cloud System

Cloud computing is a type of Internet-based computing in which a variety of resources are hosted and/or controlled by an entity and made available by the entity to authorized customers via the Internet. A cloud computing system can be configured, wherein a variety of electronic devices can communicate via a network for purposes of exchanging content and other data. The system can be configured for use on a wide variety of network configurations that facilitate the intercommunication of electronic devices. For example, each of the components of a cloud computing system can be implemented in a localized or distributed fashion in a network.

Cloud Resources

The cloud computing system can be configured to include cloud computing resources (i.e., "the cloud"). The cloud resources can include a variety of hardware and/or software resources, such as cloud servers, cloud databases, cloud storage, cloud networks, cloud applications, cloud platforms, and/or any other cloud-based resources. In some cases, the cloud resources are distributed. For example, cloud storage can include multiple storage devices. In some cases, cloud resources can be distributed across multiple cloud computing systems and/or individual network enabled computing devices. For example, cloud computing resources can communicate with a server, a database, and/or any other network enabled computing device to provide the cloud resources.

In some cases, the cloud resources can be redundant. For example, if cloud computing resources are configured to provide data backup services, multiple copies of the data can be stored such that the data is still available to the customer even if a storage resource is offline, busy, or otherwise unavailable to process a request. In another example, if a cloud computing resource is configured to provide software, the software can be available from different cloud servers so that the software can be served from any of the different cloud servers. Algorithms can be applied such that the closest server or the server with the lowest current load is selected to process a given request.

User Terminals

A customer interacts with cloud computing resources through user terminals connected to a network by direct and/or indirect communication. Cloud computing resources can support connections from a variety of different electronic devices, such as servers, desktop computers, mobile computers, handheld communications devices (e.g., mobile phones, smart phones, tablets), set top boxes, network-enabled hard drives, and/or any other network-enabled computing devices. Furthermore, cloud computing resources can concurrently accept connections from and interact with multiple electronic devices. Interaction with the multiple electronic devices can be prioritized or occur simultaneously.

Cloud computing resources can provide cloud resources through a variety of deployment models, such as public, private, community, hybrid, and/or any other cloud deployment model. In some cases, cloud computing resources can support multiple deployment models. For example, cloud computing resources can provide one set of resources through a public deployment model and another set of resources through a private deployment model.

In some configurations, a user terminal can access cloud computing resources from any location where an Internet connection is available. However, in other cases, cloud computing resources can be configured to restrict access to certain resources such that a resource can only be accessed from certain locations. For example, if a cloud computing resource is configured to provide a resource using a private deployment model, then a cloud computing resource can restrict access to the resource, such as by requiring that a user terminal access the resource from behind a firewall.

Service Models

Cloud computing resources can provide cloud resources to user terminals through a variety of service models, such as Software as a Service (SaaS), Platforms as a service (PaaS), Infrastructure as a Service (IaaS), and/or any other cloud service models. In some cases, cloud computing resources can provide multiple service models to a user terminal. For example, cloud computing resources can provide both SaaS and IaaS to a user terminal. In some cases, cloud computing resources can provide different service models to different user terminals. For example, cloud computing resources can provide SaaS to one user terminal and PaaS to another user terminal.

Customer Interaction

In some cases, cloud computing resources can maintain an account database. The account database can store profile information for registered customers. The profile information can include resource access rights, such as software that the customer is permitted to use, maximum storage space, etc. The profile information can also include usage information, such as computing resources consumed, data storage location, security settings, personal configuration settings, etc. In some cases, the account database can reside on a database or server remote to cloud computing resources such as servers or database.

Cloud computing resources can provide a variety of functionality that requires customer interaction. Accordingly, a user interface (UI) can be provided for communicating with cloud computing resources and/or performing tasks associated with the cloud resources. The UI can be accessed via an end user terminal in communication with cloud computing resources. The UI can be configured to operate in a variety of client modes, including a fat client mode, a thin client mode, or a hybrid client mode, depending on the storage and processing capabilities of cloud computing resources and/or the user terminal. Therefore, a UI can be implemented as a standalone application operating at the user terminal in some embodiments. In other embodiments, a web browser-based portal can be used to provide the UI. Any other configuration to access cloud computing resources can also be used in the various embodiments.

Collection of Data

In some configurations, during the creation of orders described above, a storage device or resource can be used to store relevant data. Examples of the data contemplated for storage are customer personal data, preference data, and weather data. The data stored can be incorporated into the disclosed systems and processes to refine the offers presented to the customers. In addition, collected data may be used for single command ordering, micro-targeting advertisements or other value added parameters described below.

Customer Personal Data

The invention contemplates that, in some instances, this gathered data might include customer personal and/or sensitive data. The invention further contemplates that the entities responsible for the collection, analysis, disclosure, transfer, storage, or other use of such data should implement and consistently use privacy policies and practices that are generally recognized as meeting or exceeding industry or governmental requirements for maintaining personal information data private and secure. For example, personal data from customers should be collected for legitimate and reasonable uses of the entity and not shared or sold outside of those legitimate uses. Further, such collection should occur only after the informed consent of the customers. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Customer Opt-Out

Despite the foregoing, the invention also contemplates embodiments in which customers selectively block the use of, or access to, personal data. That is, the invention contemplates that hardware and/or software elements can be provided to prevent or block access to such personal data. For example, the present technology can be configured to allow customers to select the data that is stored in cloud storage. In another example, the present technology can also be configured to allow a customer to specify the data stored in cloud storage that can be shared with other customers.

Although the invention broadly covers use of personal data to implement one or more various disclosed embodiments, the invention also contemplates that the various embodiments can also be implemented without the need for accessing such personal data. That is, the various embodiments of the present technology are not rendered inoperable due to the lack of all or a portion of such personal data.

Weather Data

Weather can impact the course's cash flow. Using weather data the system may automatically increase discounts. The weather data stored may be public or private data. Using the data the system can be forward looking in determining if weather will render a day unplayable and automatically offer increased discounts on that day.

For example, the weather forecast for a course on Monday may predict thunderstorms all day Wednesday. As a result, the course may offer discounted rounds of golf that may only be redeemed on Wednesdays thereby seeking to smooth out its cash flow. Such increase in discounts may be automatic or manually input by the course.

Incorporation of Additional Parameters

Micro-Targeting Advertisements

As described above, in some configurations, the data contemplated for storage are customer personal data for micro-targeting advertisement purposes. The system will use the collected personal data, outlined above, to identify the interests of specific individuals with the goal being to deliver messages to the individual through the individual's preferred communication channel. For example, the personal data that is collected may suggest that an individual always requests a cart. As a result, the system may not show the individual courses where cart rental is not an option.

Ability to Trade or Transfer Rounds

The system disclosed is not limited to a single golf course or a single individual. It is intended to provide the customer with a panoply of options. A customer may initially narrow the options he/she wishes to view, however, the system can recommend alternatives based on personal data such as prior order history, geographic location of the customer, third party reviews of the relevant courses, or advertising services purchased by the courses.

For example, a customer from Chicago, who is travelling in Philadelphia, may be presented with course options that match the courses he typically plays in Chicago (e.g., cost per round, course distance, whether carts are offered, etc.) In addition, if the customer narrows the request to only private courses, then the customer can be provided with the option to purchase a round from any number of courses that are available. The customer can then decide from which course to purchase a round(s) of golf.

Furthermore, there may be reciprocity between the courses. For example, a course in Chicago may honor the rounds purchased from a course in Philadelphia.

Finally, in some instances, the customer may be permitted to trade or gift any unused rounds to another customer.

Location Maps

The golf course, or a third party, may also transmit directions to the golf course to the customer. These directions may be in audio or visual form. For example, an individual from Chicago traveling in Philadelphia may purchase a round of golf from a course in Philadelphia, but be unsure of the preferred route to the golf course. In this situation, using the customer location data obtained from the real time positioning system, the server may determine and transmit a map of the preferred route to the golf course to the customer's mobile device. Then, by monitoring the customer's location on an interval or even continuous basis, the system can provide turn by turn directions to the customer until the customer arrives at the golf course.

Example

This example is provided for the purposes of illustration only, and the subject matter is not limited to the example, but rather encompasses all variations which are evident as a result of the teaching provided herein. The example can be implemented with regard to a golf course, or other outdoor activity, where a customer must pay to schedule a time to participate in the activity, and includes a general purpose computing device, real time positioning system, a temporal component, an Internet access point, a wireless access point, a portable personal device, and an outdoor activity. The general purpose computing device can be a portable personal device such as a mobile phone, smart phone or tablet. The Internet access point can be a wired or wireless access point.

In a non-limiting, exemplary embodiment, two golfers—Jack and Jane—use their user profiles to access the digital marketplace exchange using the system. They both live in the same area. Historically, Jack plays on the weekends during the peak golfing season, and has set criteria in his user profile to reflect his preferences. Conversely, Jane prefers to play golf when she is on vacation in Florida. Jane is not very price conscious and plays on average 10 rounds per season. Jack is considerably more price conscious and plays on average 75 rounds per season.

As Jack and Jane's user profiles disclose different purchase habits and preferences, the package persona shown in FIG. 8 would likely not be automatically offered by the system to Jane, but could otherwise be generally available at the digital marketplace exchange. Conversely, as Jack's user profile more closely aligns with the package persona in FIG. 8, the system would likely automatically offer the package to Jack due to his purchase habits and preferences.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A system for purchasing a round of golf by a customer from a golf course, the system comprising:
   a server in communication with a wired and/or wireless communication network, the server in communication with a database located at a golf course or a location remote to the golf course through the wired and/or wireless communication network; and
   a mobile computer device or a computing device, in communication with the server through the wired and/or wireless communication network, the device comprising a processor coupled to non-transitory memory, a real-time positioning system component, a temporal component and a display, executing by the processor a software application that is synchronized with the positioning system and temporal components,
   whereby the processor is configured to receive a customer profile related to preferences for rounds of golf, a customer order, a payment method and communicate the customer profile and customer order to the server;
  whereby the processor is configured to retrieve from the database of the server upon receipt of the customer profile from the software application: a customer account, and a cost for the round previously uploaded to the database by an owner, employee or agent of the golf course, at least one rule containing spatial and temporal limitations attached to the round's play previously uploaded to the database by an owner, employee or agent of the golf course; and any discount offered for the rule, previously uploaded to the database by the owner, employee or agent of the golf course;
  whereby the processor executing the software application is configured to combine the cost for the round, the rule, and any discount offered for the rule to create at least one proposed customer order;
  whereby the processor executing the software application presents the proposed customer order to the customer for purchase;
  whereby upon receipt of the customer order the processor is configured to submit the payment method for settlement for the cost of the round less any discount for the rule, credit the customer account for the round and link the round to the rule;
  whereby the processor executing the software application is further configured to actively monitor a real-time location and temporal location of the mobile computer device from the time of the customer order through the arrival of the customer at the golf course at which the round is to be played using the real-time positioning system component, and
  whereby the round may only be redeemed when both the spatial and temporal location of the device satisfy the rule linked to the round.

2. The system of claim 1 wherein when the spatial location of the mobile computer device arrives at the golf course, within a range of tolerance, the system is configured to notify the golf course of the arrival of the customer.

3. The system of claim 1
  wherein the processor is further configured to combine: two or more costs for two or more rounds, two or more rules each related to a separate round, and any discount offered for each rule, to create two or more proposed customer orders and transmit the two or more proposed customer orders to the software application.

4. The system of claim 3 wherein the two or more rounds are located at different golf courses and the processor is further configured to determine the distance between the customer and each of the different golf courses and transmit the distance between the customer and each golf course to the software application; and after receiving the distance between the customer and each golf course the software application presents the proposed customer orders to the customer in the order from the golf course closest to the customer to the golf course furthest form the customer.

5. The system of claim 1, wherein the software application is further configured to receive a reminder time from the customer and communicate the reminder time to the server, the processor on the mobile computer device is further configured to actively monitor the temporal location of the mobile computer based on the temporal component and device from the time of the customer order through and when the temporal location of the mobile computer device equals the reminder time the processor on the mobile computer device is configured to notify the customer of the round.

6. The system of claim 1 wherein the system stores personal data of the customer.

7. The system of claim 6 wherein the personal data includes a prior times and golf course at which the customer played rounds of golf.

8. The system of claim 6 wherein the personal data is used in direct marketing to the customer.

9. A system for purchasing a round of golf by a customer from a golf course, the system comprising:
  a server hosting a website in communication with a wired and/or wireless communication network, the server in communication with a database located at a golf course or a location remote to the golf course through the wired and/or wireless communication network, and
  a mobile computer device or a computing device, in communication with the server through the wired and/or wireless communication network, the device comprising a processor coupled to non-transitory memory, a real-time positioning system component, a temporal component and a display, executing by the processor a software application that is synchronized with the positioning system and temporal components
    whereby the processor is configured to receive a customer profile related to preferences for rounds of golf, a customer order, and a payment method and communicate the customer profile and customer order to the server;
    whereby the processor is configured to from the database of the server upon receipt of the customer profile from the software application: a customer account and a cost for the round, previously uploaded to the database by an owner, employee or agent of the golf course at least one rule containing spatial and temporal limitations attached to the round's play previously uploaded to the database by an owner, employee or agent of the golf course; and any discount offered for the rule, previously uploaded to the database by the owner, employee or agent of the golf course;
    whereby the processor executing the software application is configured to combine the cost for the round, the rule, and any discount offered for the rule to create at least one proposed customer order;
  whereby the processor executing the software application presents the proposed customer order to the customer for purchase;
  whereby upon receipt of the customer order the processor is configured to submit the payment method for settlement for the cost of the round less any discount for the rule, credit the customer account for the round and link the round to the rule;
    whereby the processor executing the software application is further configured to actively monitor a real-time location and temporal location of the mobile computer device from the time of the customer order through the arrival of the customer at the golf course at Which the round is to be played using the real-time positioning system component, and
    whereby the round may only be redeemed when both the spatial and temporal location of the device satisfy the rule linked to the round.

10. The system of claim 9 wherein when the spatial location of the mobile computer device arrives at the golf course after the customer order, within a range of tolerance, the system is configured to notify the golf course of the arrival of the customer.

11. The system of claim 9 wherein the processor on the mobile computer device is further configured to combine: two or more costs for two or more rounds, two or more rules each related to a separate round, and any discount offered for each rule, to create two or more proposed customer orders and transmit the two or more proposed customer orders to the software application.

12. The system of claim 11 wherein the two or more rounds are located at different golf courses and the processor on the mobile computer device is further configured to determine the distance between the customer and each of the different golf courses and transmit the distance between the customer and each golf course to the software application; and after receiving the distance between the customer and each golf course the software application presents the proposed customer orders to the customer in the order from the golf course closest to the customer to the golf course furthest form the customer.

13. The system of claim 9, wherein the software application is further configured to receive a reminder time from the customer communicate the reminder time to the server, the processor on the mobile computer device is further configured to actively monitor the temporal location of the mobile computer based on the temporal component and device from the time of the customer order through and when the temporal location of the mobile computer device equals the reminder time the processor on the mobile computer device is configured to notify the customer of the round.

14. The system of claim 9 wherein the system stores personal data of the customer.

* * * * *